United States Patent [19]

Lipskin

[11] 3,719,828

[45] March 6, 1973

[54] REMOTE CONTROLLED SWITCHING AND INDICATOR DEVICE

[76] Inventor: Ronald I. Lipskin, 215-15 17th Avenue, Bayside, N.Y. 11360

[22] Filed: May 17, 1972

[21] Appl. No.: 253,956

[52] U.S. Cl. ................307/115, 317/137, 340/166 R

[51] Int. Cl. .............................................H01h 67/00

[58] Field of Search ......307/113, 115; 317/134, 137, 317/139, 140; 340/166 R, 167 R, 168 R, 168 A

[56] References Cited

UNITED STATES PATENTS

| | | | |
|---|---|---|---|
| 3,419,731 | 12/1968 | Wheable et al. | 307/115 |
| 3,320,589 | 5/1967 | Jensen | 307/115 X |
| 3,308,432 | 3/1967 | Gerry | 307/115 X |
| 3,294,023 | 12/1966 | Martin-Vegue et al. | 317/137 X |
| 3,278,902 | 10/1966 | Zollinger | 307/115 X |

*Primary Examiner*—Robert K. Schaefer
*Assistant Examiner*—William J. Smith
*Attorney*—William T. Hough et al.

[57] ABSTRACT

In a preferred embodiment, a switching device and indicator panel suitable for utilization by incapacitated and/or handicapped persons making use of a suck and/or blow activator tube(s), including a plurality of step switches with two initial activators, one initial activator being to select which one of three circuits are to be closed at a particular moment, a first circuit being to first and second stepped switches in parallel for closing, in a fourth circuit, one of several possible stepped contacts connected with alternative separate sub-circuits, any one of which is completable of the closed fourth circuit for one of the first and second stepped switches with a corresponding plurality of contacts closable of the fourth circuit for the other of the first and second stepped switches, each of the sub-circuits of the first and second stepped switches being connected and aligned along one of an x and y axes, and third and fourth stepped switches for making and breaking closed circuits for any one of the sub-circuits of the first stepped switch and for any one of the sub-circuits for the second stepped switch as connected with the other of the x and y axes of the lattice of sub-circuits of the first stepped switch and of the second stepped switch, whereby at any one time a series of switches along a row of a plurality of rows along an x axis is completed in its circuit with one of the completed contacts of the second stepped switch for one series of the plurality of switches in one of a plurality of rows of switches along the y axis, thereby making it possible by selectively choosing the particular sub-circuit of each of the first and second stepped switches to select a specific sub-circuit, each sub-circuit including in series therewith at least one stepped switch activatable of and deactivatable of a power circuit and preferably an indicator light, with a corresponding sub-circuit having an indicator light instead of a stepped switch, whereby the lighting of a specific indicator light is indicative of the activation position for a particular remote switch for turning on or off a particular power circuit, and when a particular power circuit has been selected, the selector switch for selecting one of the first stepped switch, or second stepped switch, or control for turning off and on power through the contacts made in the matched contacts of both of the stepped switches, is activated again so as to step to the control circuit, and then the activator for the control circuit is actuated by sucking or blowing as the case may be on the necessary tube in order to turn on the plug or alternatively to turn off the plug, thereby being a plurality of checkerboard lights matched with a plurality of checkerboard power plugs into which different electrical appliances or the like, such as a toaster, a television set, an FM radio, an AM radio, an intercom, and an automatic or remote controlled typewriter, a tape recorder, a phonograph, a telephone, a call signal for nurse or doctor, or the like are utilizable in one or more of the plurality of available plugs, any one or more of which may be operated separately or simultaneously by virtue of merely the two separate switches which may be separate such and/or blow tubes or may be a single tube of which one switch is activated by sucking and the other switch is activated by blowing.

12 Claims, 6 Drawing Figures

United States Patent [19]
Lipskin
[11] 3,719,828
[45] March 6, 1973
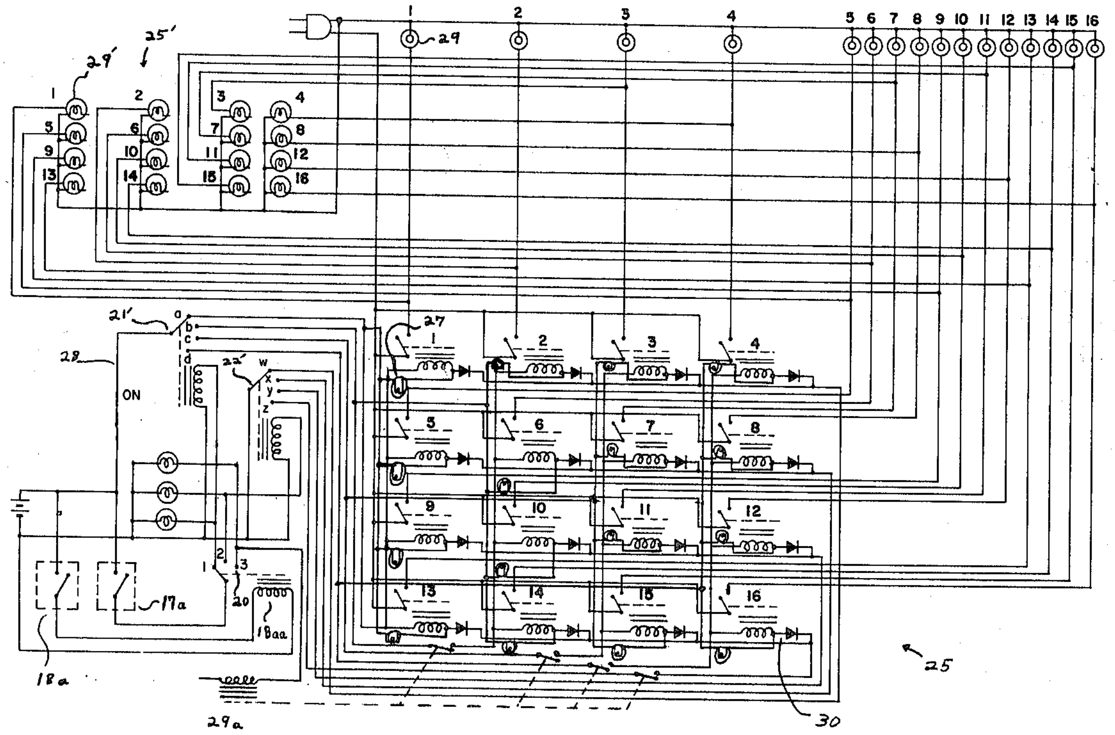

REMOTE CONTROLLED SWITCHING AND INDICATOR DEVICE

This invention relates to a remote controlled switching panel and indicator lights for use by handicapped or incapacitated persons.

BACKGROUND TO THE INVENTION

Prior to the present invention there have been developed various articles and appliances and gadgets for utilization by handicapped or incapacitated persons such as typewriters that may be activated by shining a light into photo-sensitive light or by touching certain points with shafts carried in the lips of the person, or the like, as well as photo-electric cells receivable of a light signal for activation of a particular appliance. All of these gadgets and devices have contributed to the convenience and enjoyment of living as well as to meeting some of the necessary functions of life for various people unfortunate enough to have such a need. However, there is still a great need for improved simplicity of operation and actuation of various mechanisms of selecting one or more of a plurality of various appliances, gadgets or the like, for turning off and on the gadgets or for signalling or for making best use of any or more of the prior devices mentioned above.

SUMMARY OF THE INVENTION

Accordingly, an object of the present invention is to obtain a remote controlled switching device of improved simplicity.

Another object is to obtain a remote control switching device of improved efficiency of operation and/or construction.

Another object of the present invention is to obtain a switching device in which visually a person may determine exactly which device is on and/or which device is off, and/or where on a checkerboard of possible devices to be activated the present connection of circuits is located in order that the operator may know what activation is necessary to align switches in order to select another particular power circuit.

Another object is to obtain indicator lights to indicate when a particular power circuit is on or off.

Another object is to obtain a circuitry whereby a person visually may ascertain which of various circuits are presently activatable by one or more of the primary switches manually controlled by the operator, such as blow switches for example.

Other objects become apparent from the preceding and following disclosure.

One or more of the preceding objects are obtained by the invention as described hereafter.

Broadly the invention includes a major circuit having two major subcircuits in parallel, one of the major subcircuits having several relay stepped switches and the other major subcircuit having several corresponding indicator lights for indicating which of the subcircuit relay switches is presently connected for possible activation, with each major subcircuit being further divided into a plurality of other subcircuits having a first stepped switch at the beginning thereof and a second stepped switch at the end thereof such that by activating a particular one of the contacts of the stepped switch at the beginning of the sub-subcircuit and by activating a particular one of the contacts of the second sub-subcircuits, there is thereby activated a predetermined relay stepped switch which controls the turning off and on of a power circuit, the indicator light circuit being arranged for the other major subcircuit in a like manner whereby a particular indicator light corresponds to the particular relay switch and is lighted whenever the circuit for the particular relay switch controlling the power circuit is in circuit ready for activation or deactivation. Thereby visually the operator can determine whenever the closing of that relay switch circuit will turn off or turn on that particular power plug. Each power plug circuit also preferably includes an indicator light such that when activated the light is on indicating that the circuit is on and when the circuit is off, the light is off indicating that the circuit for the power for that particular plug is off. In simplified embodiments of the particular invention, the same principle is employed, namely of power activation of subcircuits being selectable along a plurality of possible rows of switches on an x axis, while a second switch in series with the plurality of subcircuits is selectable of the switches in rows along the y axis, whereby at any one time one of the x axes will cross one of the y axes for completing a particular circuit and merely by continuing the movement of the stepped switch of either or both of the switches before and after the sub-subcircuit relay switches there can be chosen a particular power plug for subsequent activation or deactivation, as the case may be by the operator once allowing for a particular switch then shifting to the control circuit for activation or deactivation of a particular plug by activating or deactivating the particular relay switch and control thereof.

Multiple jacks allowing each of several individual patients concurrent access to utilize a common unit with his individual suck-and-blow switch unit.

THE FIGURES

FIG. 1A illustrates one of the simpler embodiments of the present invention as well as a variation from other embodiments, there being a multiplicity of different manners in which the switches may be connected still within the basic principle of the present invention. Accordingly, FIG. 1B illustrates a representative indicator panel mounted in a box carrying also a plug for plugging in the blow and/or suck switch(es) and having the corresponding power plugs as corresponding to the indicator panel.

FIG. 2 illustrates a more involved circuitry of a different embodiment of the present invention in which a plurality of relay switches of the stepped type preferably, are aligned in vertical and horizontal rows for at least purposes of simplicity of understanding the mechanism of operation thereof, and with a corresponding plurality of vertically and horizontally aligned indicator lights for indicating which relay switch is at any particular time ready for activation or deactivation as controlled by the off and on switch of a control circuit whenever the first and second gang switches aligning the anterior and posterior contacts of the subcircuits of the plurality of relay switches have been matched by the operator.

FIG. 3 illustrates the typical appearance of an indicator panel for the embodiment of FIG. 2, for example, with their being a plurality of possible floor receptacles activatable at any one or more times separately or simultaneously as indicated on the panel, and there also being as shown the corresponding plugs, as matched in relative position to the device, for simplicity of use thereof.

FIG. 4 typically illustrates a suck and blow switch(es) having male plugs of the type insertable into the double female plug on the face of the panel shown in FIG. 3.

FIG. 5 illustrates a preferred and more complicated version of the present invention, also including preferred fuses and the like. The indicator panel of FIG. 3 would also typically be utilizable with the embodiment of FIG. 5.

DETAILED DESCRIPTION OF THE INVENTION

In greater detail the invention may be better understood by reference to Figure embodiments as described in the preceding Figures.

Figure 1A:
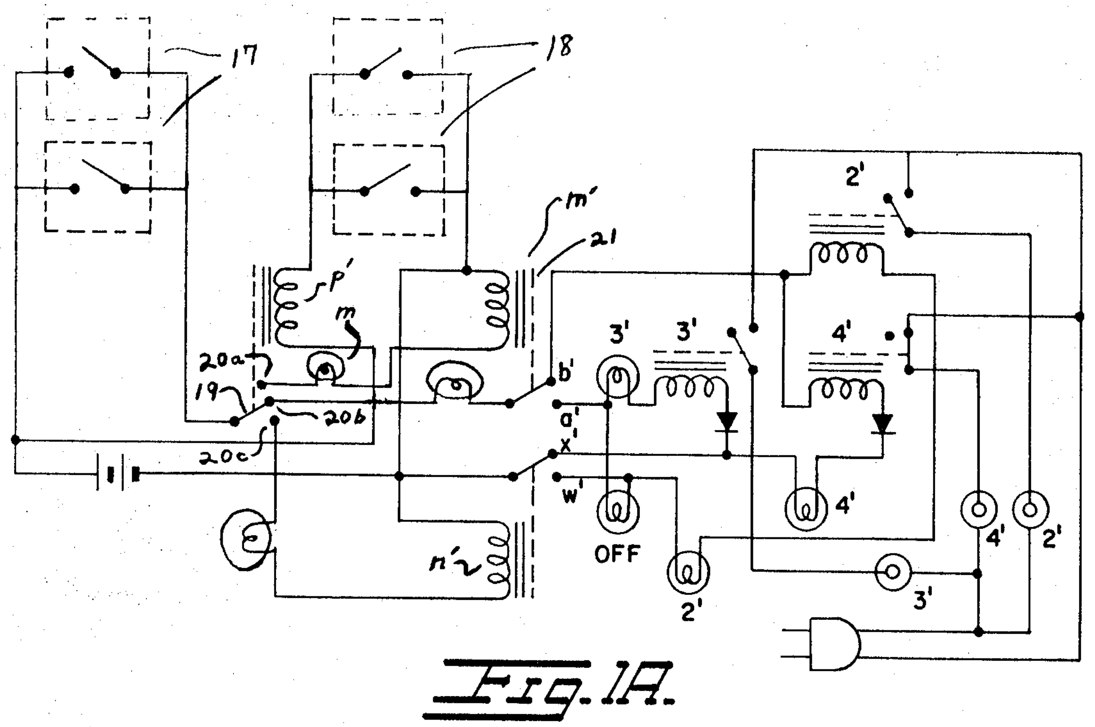
Figures 1B, 3, 4:
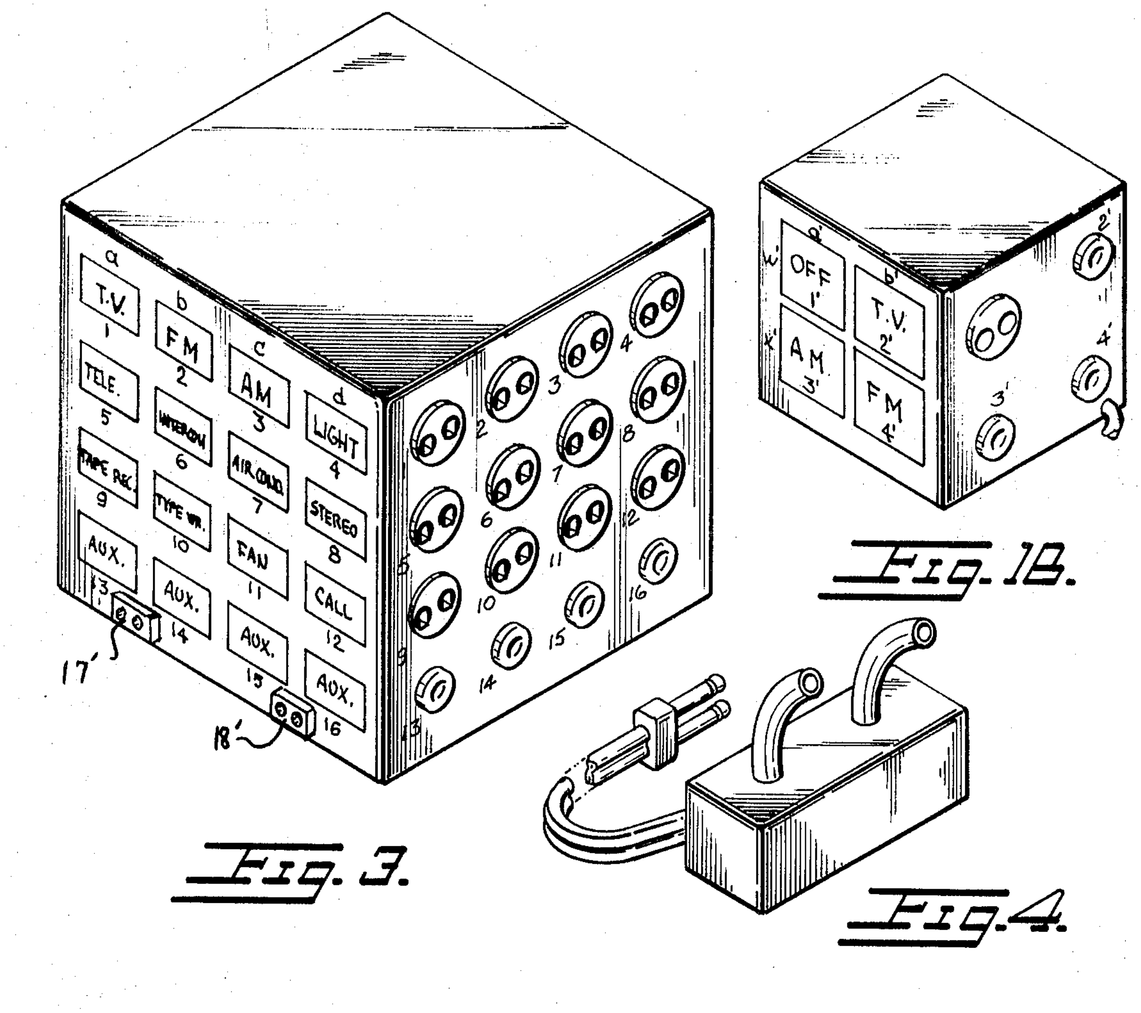

FIG. 1B illustrates a typical viewer and mounting for the particular sub-relay switch power receptacle as well as the structure for the mounting of the special receptacle 23 receivable of the double plug typically of the type illustrated for the two separate switches of FIG. 4, the FIG. 4 illustrating the double plug 24 with the two male and separate circuits 24*a* and 24*b*. In the structure of FIG. 1B, it can be seen more clearly, the relationship of the various sub-switches and their interrelated circuitry as could be simply controlled and easily understood by a person without technical training.

Figure 2:
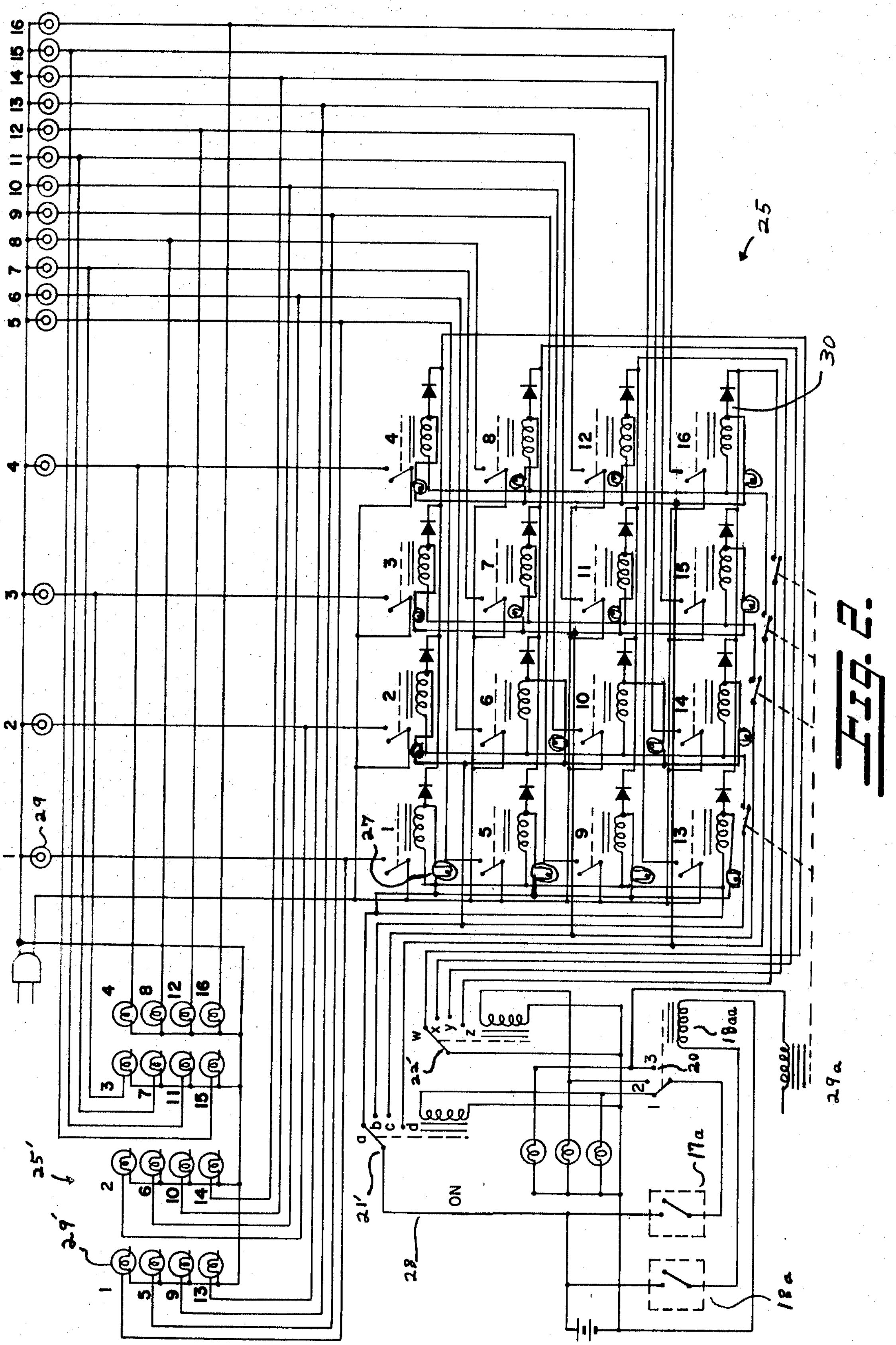

FIG. 2 illustrates a different embodiment, differing primarily only in the arrangement of the particular subcircuit relay lights in parallel instead of in series, thereby being a utilization of two separate circuits for the respective relay switches and the indicator lights corresponding thereto as indicative of solely which relay switch would be activated whenever the actuation switch is closed for passing current therethrough. The only other major difference is the fact of a greater number of switches being employed in this embodiment, for example 16 relay switches and plugs to be activated instead of the FIG. 1A four positions and of the four positions, three being activatable plug sites.

In greater detail, the FIG. 2 embodiment includes the plurality of relay switches 25 and the plurality of corresponding indicator lights 25', with the relative switch positions and light positions being identified by common numbers. One of the differences from the embodiment of FIG. 1A mentioned above is the fact that the indicator light 27 for the subswitch 1 is in parallel with the relay switch rather than in series. However, additionally it should be noted that power at all times is furnished to the circuit 28 flowing through the contact arm of the stepped relay switch 21', the activator control through contact 20*c*' being by way of gang switch 29 for making and breaking circuit beyond a point at which the light 27, for example, receives its source of power, such that whenever contact A of switch 21' is closed and correspondingly whenever contact W of switch 22' is closed, the light 27 always is on thereby indicating that this is the circuit which if activated will turn off or on the plug 29, which on the circuit 25' will cause the light 1 thereof to become lighted which in FIG. 3 would correspond to the TV position where the WX axis crosses the AY axis, the plug 29 also being identified in FIG. 3 as the 1 position plug. Although there may be separate panels for the indication of the activation of a plug from the off to the on state whereby in the on state the light would be on, such as the light of the 1 position of light circuit 25', as separate from a panel in which the light 27 indicates that this switch is the position which will be turned on or off by actuation of a current through the sub-circuit relay switch in parallel therewith, it is preferred that the two lights be located behind the same typically opaque glass and that for example, the position light 27 be a white light whereas the off-on indicator light such as light 29' of the 1 position be a red light or other distinctive color. By such a system a white light for a position even where the red light was on could clearly and easily be distinguished and yet for every on position where the white light was not located, the red light would be indicative of that position being on by virtue of the red light being lighted and would not be readily confusable with the white light indicative of the location of the control insofar as which switch at a particular time can be activated or deactivated.

For each of the embodiments of FIGS. 1A and FIG. 2, behind the respective sub-circuit relays, or in other equivalent positions in circuit for acheiving the same function, there is located a one-way — i.e. unidirectional flow, such as a diode 30. These diodes are necessary to prevent the backflow of current to cause at least partial elimination of light and switches of circuits not intended to be activated.

FIG. 4 in greater detail as the specific embodiment shown includes the double male plug 24 indicative of the fact that the suck/blow switch 31 controls two separate switches, the blow tube 31*a* and the blow tube 31*b* controlling either or both switches possibly.

FIG. 1A illustrates a switch circuitry 26 including separate activator switches 17 and 18, the switch 17 serving to complete a power circuit furnishing power to whichever subcircuit is connected in series therewith as controlled by switch 18. The switch 18 when activated initiates a step by the stepped switch 19 which at all times will be connected to one of the respective subcircuits of one of contacts 20*a*, 20*b*, or 20*c* when the switch 17 is closed and when the stepped switch 19 is in a closed-contact state with contact 20*a* stepped relay switch 21 is thereby connected such that activation by switch 17 causes the relay switch 21 to take a step from one of the contacts B' and A' to the other of the contacts B' and A', the stepped switch 21 being at all times in closed circuit with at least one of the contacts B' or A'. When the stepped switch 19 is in contact with the contact 20*a* and when the stepped switch 21 is closed with a contact B', thereafter activation of the switch 17 sends current through this subcircuit thereby is furnishable of current by closed leads to each of stepped relay switch 2' and stepped relay switch 4'; however current does not flow through both of these switches 2' and 4' simultaneously but flows through only one of the switches depending upon which of contacts X' and W' are in closed circuit with the stepped switch 22 which when closed completes the circuit whenever the activator switch 17 is activated through the switch 19 in contact with contact 20*c* such that when the B' contact is closed and when the X' contact is closed, activation of switch 17 serves to activate the subcircuit switch 4' and its corresponding light in series. It should be noted that this light becomes lighted solely upon the closing of switch 17 when switch 19 is in contact with contact 20c the subcircuit switch 4' thereby moving from one contact to another between the open and closed state, at all times being at one or the other as a result of being a stepped switch. Each activation of the switch 4' merely moves its respective stepped switch to the other state of either being closed or open depending on the state of the switch at the time of activation. When the stepped relay switch 22 has the subcircuit closed for contact W', subcircuit switch 4' is not activatable, but subcircuit switch 2' is activatable, together with its light in series therewith, if the contact B' is still in a closed state for switch 21. The selection of the contacts X' or W', one or the other is controlled by the stepped switch 22 when the switch 19 is in contact with the contact 20b, activation of switch 17 serving to cause the switch 22 to step from one position to the other of the X' and W' positions, activation of this switch being indicated by its respective indicator light in series which light is in a lighted state only during the time that switch 17 is closed. If the switch 19 is in contact with the contact 20a, and the activator switch 17 is closed to cause the current flow through the relay stepped switch 21, the switch 21 relay steps from contact B' to contact A' whereby if the stepped switch 22 is in contact with the contact W' instead of in contact with the X', current is flowable through the contact A' through the off light which means that no relay switches are in a state to be turned either on or off by the closing of actuation switch 17 when the switch 19 is in contact with the contact 20c. On the other hand, when the switch 22 is in contact with the contact X' as illustrated but when the switch 21 is in contact with the contact A', the relay stepped switch 3' may be activated by the closing of activator contact 17 when the switch 19 is in contact with the contact 20c, whereby activation of the activation switch 17 causes the subcircuit switch 3' to step from one of a closed position or off position to the other of the closed or off position, depending upon its state at the time of activation of activator switch 17. Accordingly activation of the current through subcircuit contacts A' and through the subcircuit switch 3' activates the switch 3' light in series, and whenever the sub-circuit relay switch 3' switches to the on position, the light in series therewith becomes lighted and stays lighted so long as this power circuit is on, depending on the manner in which the blow switch 31 is constructed; typically however, the blowing on blow tube 31*a* activates one switch and the sucking on the tube 31*a* activates another separate switch or alternatively the sucking on tube 31*b* activates the first switch and the blowing on tube 31*b* activates the other switch. There may be several such switches in parallel, for incapacitated persons unable to use their hands. Often, even for such incapacitated persons, some persons have an ability merely to blow and not to suck, while others have solely an ability to suck but not to blow into such a tube sufficiently effectively to activate a circuit as would be required for the operation of the remote control systems of either of FIGS. 1A and 1B, and of FIG. 2 and FIG. 3.

Figure 5:
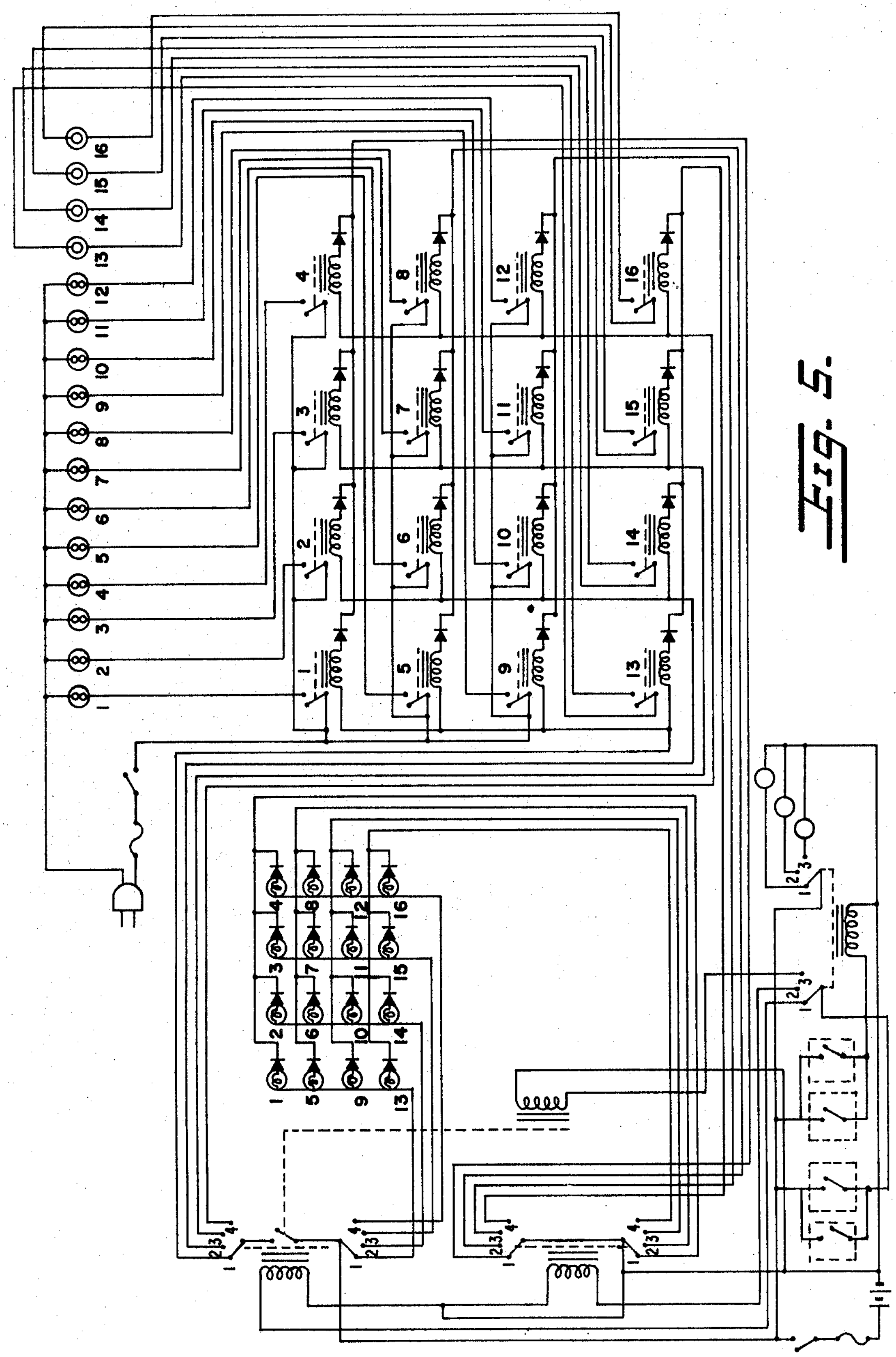

FIG. 5 illustrates a particular preferred embodiment of the present invention, basically differs from the embodiment of FIG. 2 in that the indicator lights indicating the position of the specific subcircuit relay lights which at any particular time can be activated, is located in a circuit which corresponds to an identical circuitry of the subcircuit relay switches with the exception of the fact that the indicator light panel is at all times powered such that although a subcircuit relay switch is not activated at a particular time, the light nevertheless continues to show the position in the same manner as in FIG. 3, except that the light by virtue of being in a parallel system-circuit are controlled by a gang switch instead of the nongang switch 21' of FIG. 2. In the FIG. 5 embodiment, the plurality of relay switches 25' correspond to the plurality of relay switches 25 of FIG. 2, and the circuitry 25'' of the indicator lights of the FIG. 5 embodiment controlled by the stepped switch 21*b*', corresponds to the lights of parallel circuitry of the FIG. 2 embodiment, for example the light 27' of FIG. 5 indicating the number 1 position being comparable to the light 27 of FIG. 2 indicating the number 1 position for the particular relay switch which will be activated whenever power is sent therethrough. The functions of the respective switches 21*a' and 21b* are the equivalent of the function of the single gang switch 29 of the FIG. 2 embodiment.

In the FIG. 5 embodiment, the activator switch 17' corresponds to the FIG. 1A switch 17 and the FIG. 2 switch 17*a*, while the FIG. 5 switch 18' corresponds to the FIG. 1 switch 18 and to the FIG. 2 switch 18*a*. The FIG. 5 switch 29' corresponds in function to the switch 29 of FIG. 2.

In the same manner that the indicator lights for the positions presently activatable for the FIG. 5 embodiment are made possible by parallel circuitry for the indicator lights as paralleling the circuitry of the relay switch system circuitry, similarly the FIG. 5 embodiment has a separate light circuitry 32 controlled by a gang switch 18'' which compares with the single switch of switch 18 of FIG. 1 and the single switches 18*a* and 18*aa* of FIG. 2. Accordingly, in the FIG. 3 panel which is representative of the panel and plug arrangement for either of the embodiments of FIGS. 2 or 5, the indicator lights R, S, and P, are indicative of positions 1, 2, and 3, respectively, of each of FIGS. 2 and 5, which respective conditions correspond to the positions 20*a*, 20*b*, and 20*c* of FIG. 1A.

From the preceding disclosure it can be appreciated that there may be a number of variations, as well as that for example, other conventional circuitry such as fuses, the battery locations, and other circuit breaking switches such as switch 33 are utilizable as a part of the present invention as would be apparent to a person of ordinary skill. Similarly, such modifications and substitution of equivalents as would be apparent to a person having ordinary skill in this field are within the scope and spirit of the present invention. Typical of multiple patient jacks are jacks 17' and 18'.

I claim:

1. A switching device comprising in combination an electrical circuit including at least first and second step-switch means in series, each step switch means having at least first and second stepped contacts, at least one of the stepped contacts of said second switch means being in series with at least a plurality of the first and second stepped contacts of the first switch means;

control means for switching separately and selectively each of said first and second switch means; and sub-circuit means separately closeable by said control means for each of matched contacts in series, of said first and second switch means whenever at least a predetermined particular one of said first switch contacts is closed and at least a predetermined particular one of said second switch contacts is closed; of said circuit, each portion that connects a second switch means contact with one of said first switch means contacts, including each of a uni-directional rectifier means and a relay switch means in circuit series between the matched contacts.

2. A switching device of claim 1, about each said relay switch being closeable of a power circuit.

3. A switching device of claim 2, about each said relay switch means including a step switch.

4. A switching device of claim 3, about each power circuit including a receptacle outlet.

5. A switching device of claim 4, in which each one of at least the first and second stepped contacts of the second switch means is in series with substantially all of the stepped contacts of the first switch.

6. A switching device of claim 5, in which said sub-circuit means includes a gang circuit-breakable step-switch, having a particular separate circuit-breakable switch element in the circuit of each said second stepped contact in series between said first stepped switch means and said second stepped switch means, located to separately control current flow through one said relay switch, separate from other current-flow through others of said relay switches.

7. A switching device of claim 6, in which for a circuit of said particular one of said rectifier means said separate circuit-breakable switch element is located in series between (a) a particular one of said first stepped contacts and (b) at least one of said one relay switch and a particular said rectifier means in series with said one relay switch.

8. A switching device of claim 7, including in parallel with said one relay switch and with said switchable element in series with said series-located one switch element, an indicator means indicatable of whether said particular one first stepped contact is closed.

9. A switching device of claim 8, in which said indicator means is a light.

10. A switching device of claim 7, including in series with said particular one relay switch between said particular one first switch contact and said particular rectifier means, an indicator means indicatable of whether said particular one first stepped contact is closed.

11. A switching device of claim 10, in which said indicator means is a light.

12. A switching device comprising in combination: a first switch means; a second switch means; a third switch means; a fourth switch means; a fifth switch means; a sixth switch means; a plurality of at least first, second, and third outlet relay switch means; a power outlet for about each outlet relay switch means; said third, fourth, fifth, and sixth switch means being step relay switches; said third switch means having at least first, second, and third stepped contacts; a first power circuit including said power source, said first switch means and said third step switch means connected in series such that closing said first switch means causes said third step switch to move from a closed position for one of said stepped contacts to at least another one of said stepped contacts; a second circuit including one of said stepped contacts and said fourth switch in series with said second-circuit one stepped contact, said second circuit being closeable by said third switch means closing circuit with said third contact; a power third circuit closeable by step-closing of said fourth switch means, said fourth switch means being in series with and activatable of said fifth switch means when said fourth switch means is closed; said fifth switch means having at least first and second stepped contacts; at least one of said plurality being in circuit with one of said fifth-switch means stepped contacts, and at least two of said plurality being in circuit with another of said fifth-switch means stepped contacts; said sixth switch means including a predetermined number of stepped contacts, said predetermined number being at least as large as said fifth-switch stepped contacts, one of said predetermined number being in series with said fifth-switch means; one of said stepped contacts and another of said predetermined number being in series with at least two of said plurality, with said fifth-switch means and with another said stepped contacts; and said sixth switch means being step closeable of electrical circuit by contact with said predetermined number when for a particular sixth switch closed stepped contact a corresponding fifth-switch means stepped contact is simultaneously closed.

* * * * *